W. C. REED.
DIRECTION SIGNAL.
APPLICATION FILED NOV. 4, 1916.
1,250,506.
Patented Dec. 18, 1917.
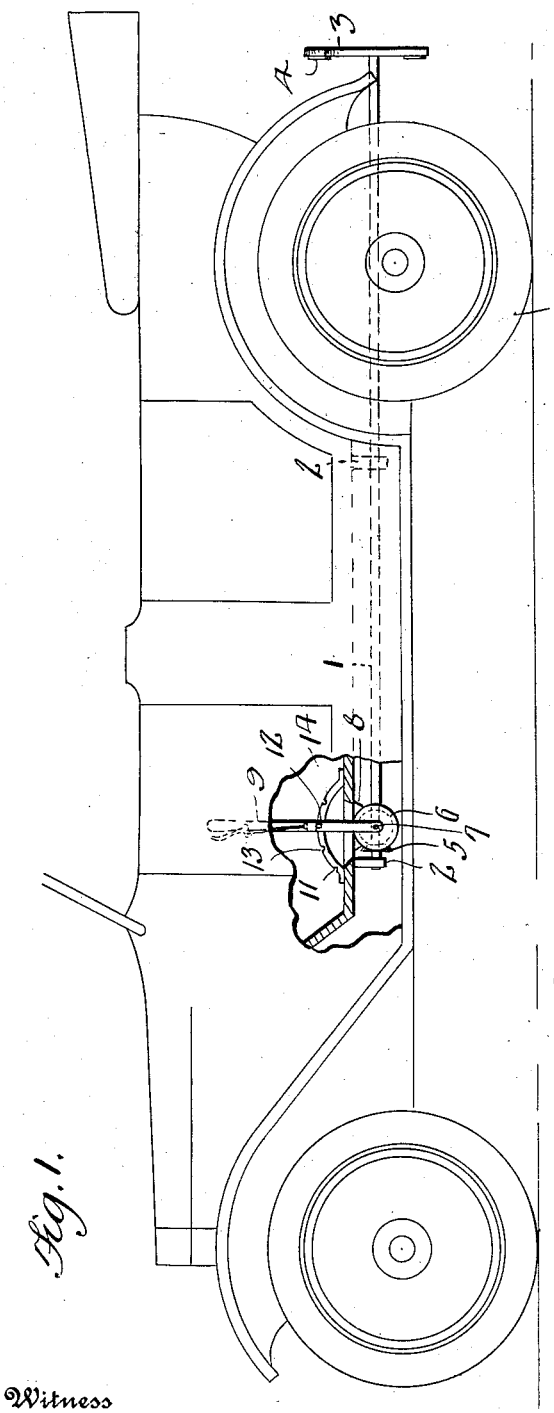
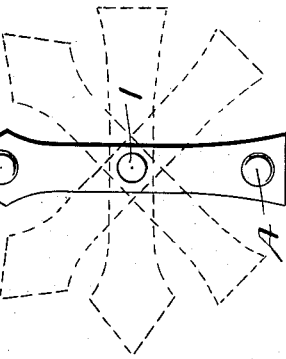
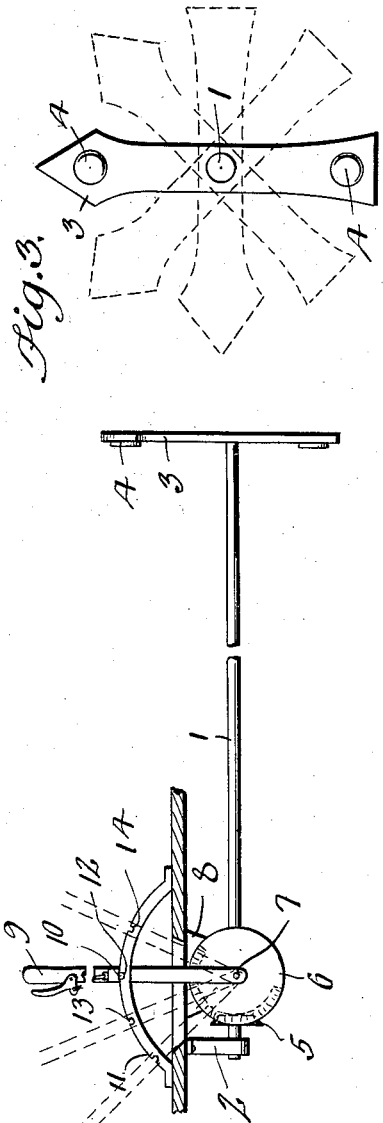
Inventor
W. C. Reed,
By Victor J. Evans
Attorney
Witness

UNITED STATES PATENT OFFICE.

WILLIAM C. REED, OF CANTON, OHIO.

DIRECTION-SIGNAL.

1,250,506.     Specification of Letters Patent.     Patented Dec. 18, 1917.

Application filed November 4, 1916. Serial No. 129,557.

*To all whom it may concern:*

Be it known that I, WILLIAM C. REED, a citizen of the United States, residing at Canton, in the county of Stark and State of Ohio, have invented new and useful Improvements in Direction-Signals, of which the following is a specification.

This invention is an improved direction signal or indicator for use on an automobile or other vehicle to indicate to others the intended direction of travel of the vehicle, especially where it is the desire of the operator to turn the vehicle in one direction or the other and to also indicate when the vehicle is standing still, the object of the invention being to provide an improved direction signal and indicator of this character which may be readily installed in an automobile, which is under the direct control of the operator and which, when the vehicle is standing still, is entirely out of the way.

The invention consists in the construction, combination and arrangement of devices hereinafter described and claimed.

In the accompanying drawings:

Figure 1 is a diagrammatic elevation of an automobile provided with a direction signal or indicator constructed and arranged in accordance with my invention.

Fig. 2 is a detail elevation of the signaling and indicating apparatus, on a larger scale.

Fig. 3 is a rear elevation of the same.

In accordance with my invention I provide a shaft 1 which is arranged longitudinally under the bottom of the body of the vehicle, is mounted in suitable bearings 2 and is provided at its rear end with an indicating element or pointer 3 which is here shown as shaped like an arrow and which is provided near its ends with signal lights 4 which are preferably red. These signal lights may be of any suitable construction. To the front end of the shaft is secured a beveled segment gear 5. A segment gear 6 engages the gear 5 and is mounted on a stub shaft 7 which is held by a suitable bracket 8 which depends from the bottom of the car. A lever 9 for operation by the driver of the vehicle has its lower end secured to the gear 6. The said lever passes up through and operates in a slot in the floor of the vehicle and is provided with a suitable dog 10 or other suitable locking devices which may be engaged with notches 11, 12, 13 or 14 with which a locking segment 15 is provided. The notch 11 is near the front side of the locking segment. The gears 5, 6 and the indicating element 3 are so arranged that when the lever 9 is turned forwardly and engaged with the notch 11 the indicator 3 will be held by the shaft 10 in a horizontal position thus indicating to those in rear of the vehicle that the vehicle is at a stand still or is about to come to a stop. When the lever 9 is in a vertical position and engaged with the notch 12 the indicator 3 is in a vertical position, thus showing that the vehicle is proceeding straight ahead. When the lever is turned forwardly and engaged with the notch 12 the pointed end of the indicator 3 is turned to the left, thus indicating that the vehicle is about to turn to the left. When the lever is turned rearwardly and engaged with the notch 14 the pointed end of the indicator is turned to the right, thus indicating that the vehicle is about to turn to the right. It will be understood that the gears 5, 6 which connect the lever and the shaft 1 enable the latter to be turned to the desired extent and in the desired direction by the lever and hence the indicator or signaling element 3 with its lights 4 is always directly under the control of the vehicle driver. At night the signaling lamps serve to indicate the position of the indicator as will be readily understood. The signaling lights also serve the purpose of a tail light.

When the signaling apparatus is set to stop position the lever 9 is turned forwardly and is entirely out of the way so that movements of the operator in entering or leaving the vehicle are not obstructed by the signal operating lever.

Having thus described the invention what is claimed is:

A direction signal for use on a vehicle and comprising a bracket adapted to be secured to the bottom of a vehicle and having a stub shaft, a beveled gear on said stub shaft, an operating lever attached to said gear, a signal adapted to be mounted on the vehicle bottom and having adjusting notches for engagement by a stop element of the lever, a pair of bearings adapted to be attached to the bottom of the vehicle and a shaft mounted in said bearings and having a signaling element at the rear end and a beveled gear near the front end for engagement with the first-named beveled gear.

In testimony whereof I affix my signature.

WILLIAM C. REED.

Witness:
 LEONARD I. FITZGERALD.